United States Patent
Deng et al.

(10) Patent No.: US 10,374,519 B2
(45) Date of Patent: Aug. 6, 2019

(54) LLC RESONANT CONVERTER AND METHOD FOR SUPPRESSING RIPPLES IN OUTPUT VOLTAGE THEREOF

(71) Applicant: Astec International Limited, Kowloon (HK)

(72) Inventors: Shi Jie Deng, Guangdong (CN); Qing Feng Liu, Guangdong (CN); Guang Quan Li, Guangdong (CN); Zhao Fu Zhou, Guangdong (CN); Zhao Tu Fan, Guangdong (CN)

(73) Assignee: Astec International Limited, Kowloon (HK)

(*) Notice: Subject to any disclaimer, the term of this patent is extended or adjusted under 35 U.S.C. 154(b) by 0 days.

(21) Appl. No.: 15/185,718

(22) Filed: Jun. 17, 2016

(65) Prior Publication Data
US 2016/0373015 A1     Dec. 22, 2016

(30) Foreign Application Priority Data

Jun. 17, 2015  (CN) .......................... 2015 1 0338468

(51) Int. Cl.
*H02M 3/337* (2006.01)
*H02M 1/00* (2006.01)

(52) U.S. Cl.
CPC .. *H02M 3/3376* (2013.01); *H02M 2001/0022* (2013.01); *H02M 2001/0058* (2013.01);
(Continued)

(58) Field of Classification Search
CPC ....... H02M 3/3376; H02M 2001/0022; H02M 2001/0058
See application file for complete search history.

(56) References Cited

U.S. PATENT DOCUMENTS 4,523,152 A * 6/1985 Garde ................... H03F 3/2171
                                                              330/151
6,611,823 B1 * 8/2003 Selmic ................. G05B 13/027
                                                              700/44
(Continued)

OTHER PUBLICATIONS

Improving Output Voltage Ripple of the NCP3063 Series of Switching Regulators by Applying a Simple Feed-Forward Technique (6 pages), Solley, Dennis, Mar. 2007.
(Continued)

*Primary Examiner* — Jue Zhang
*Assistant Examiner* — Lakaisha Jackson
(74) *Attorney, Agent, or Firm* — Harness, Dickey & Pierce, P.L.C.

(57) ABSTRACT

The present disclosure discloses an LLC resonant converter and a method for suppressing ripples in output voltage of the LLC resonant converter. The LLC resonant converter comprises: a half-bridge or full-bridge chopper having a driving circuit, an inductance-capacitance series resonant network coupled to the chopper, an isolation transformer coupled to the resonant network, and a rectification and filtering circuit coupled to the isolation transformer; a feedforward controller coupled to generate a feedforward signal based on an input voltage; and a controlled oscillator coupled to receive the feedforward signal from the feedforward controller and to control an operating frequency of the chopper via the driving circuit based on the feedforward signal. Thus, a feedforward correction is provided for the LLC resonant converter, so that ripples in a DC output voltage of the LLC resonant converter are reduced.

14 Claims, 8 Drawing Sheets

(52) U.S. Cl.
CPC ....... *Y02B 70/1433* (2013.01); *Y02B 70/1491* (2013.01); *Y02P 80/112* (2015.11)

(56) References Cited

U.S. PATENT DOCUMENTS

| | | | | |
|---|---|---|---|---|
| 2005/0017695 A1* | 1/2005 | Stanley | ............... | H02M 1/4208 |
| | | | | 323/207 |
| 2010/0085230 A1* | 4/2010 | Son | ............... | H03M 3/344 |
| | | | | 341/155 |
| 2012/0257429 A1* | 10/2012 | Dong | ............... | H02M 3/1582 |
| | | | | 363/127 |
| 2014/0140113 A1* | 5/2014 | Oh | ............... | H02M 1/4241 |
| | | | | 363/89 |
| 2015/0171888 A1* | 6/2015 | Breems | ............... | H03M 3/368 |
| | | | | 341/143 |

OTHER PUBLICATIONS

Output Voltage Ripple Reduction of a High Power Factor Model Operated Isolated Charge-Pump AC\DC Converter (4 pages), Sippola, M., 2003.

\* cited by examiner

LLC RESONANT CONVERTER AND METHOD FOR SUPPRESSING RIPPLES IN OUTPUT VOLTAGE THEREOF

CROSS-REFERENCE TO RELATED APPLICATION

This application claims the benefit and priority of Chinese Patent Application No. 201510338468.6 filed Jun. 17, 2015. The entire disclosure of the above application is incorporated herein by reference.

FIELD

The present disclosure relates to the field of switching power supplies, and particularly to an LLC resonant converter and a method for suppressing ripples in an output voltage of the LLC resonant converter.

BACKGROUND

This section provides background information related to the present disclosure which is not necessarily prior art.

An LLC resonant converter having excellent efficiency characteristics is widely used as a direct current/direct current converter. However, a problem of ripple output may arise. Unlike high-frequency switching noises, ripples are within a low frequency range of a spectrum. In general, ripples come from an electrical grid, and a frequency of the ripples is twice as much as that of commercial electricity, approximately 100 Hz or 120 Hz. In most applications, the amplitude of output ripples needs to be limited, since unlimited ripples may cause unstable performance, abnormal operation or even damage of equipment.

In the prior art, by using a method of performing feedback control to increase an open-loop gain, output ripples of an LLC resonant converter are reduced to some degree. However, this method is not very effective in reducing ripples, because it is difficult to make a tradeoff between stability and a high gain.

SUMMARY

This section provides a general summary of the disclosure, and is not a comprehensive disclosure of its full scope or all of its features.

The present disclosure provides an LLC resonant converter, which uses a feedforward correction to suppress ripples in an output voltage.

According to an embodiment of the present disclosure, there is provided an LLC resonant converter, comprising: a half-bridge or full-bridge chopper having a driving circuit, an inductance-capacitance series resonant network coupled to the chopper, an isolation transformer coupled to the resonant network, and a rectification and filtering circuit coupled to the isolation transformer; a feedforward controller coupled to generate a feedforward signal based on an input voltage; and a controlled oscillator configured to receive the feedforward signal from the feedforward controller and to control an operating frequency of the chopper via the driving circuit based on the feedforward signal.

According to another embodiment of the present disclosure, there is provided a method for suppressing ripples in an output voltage of an LLC resonant converter, the LLC resonant converter comprising a half-bridge or full-bridge chopper having a driving circuit, an inductance-capacitance series resonant network coupled to the chopper, an isolation transformer coupled to the resonant network, and a rectification and filtering circuit coupled to the isolation transformer, the method comprising: generating a feedforward signal based on an input voltage; and controlling an operating frequency of the chopper based on the feedforward signal.

According to a further embodiment of the present disclosure, there is provided a method for suppressing ripples in an output voltage of an LLC resonant converter, the LLC resonant converter comprising a half-bridge or full-bridge chopper having a driving circuit, an inductance-capacitance series resonant network coupled to the chopper, an isolation transformer coupled to the resonant network, and a rectification and filtering circuit coupled to the isolation transformer, the method comprising: generating a feedforward signal based on an input voltage; generating a feedback signal based on an output error voltage of the LLC resonant converter; generating a control signal by summing the feedback signal and the feedforward signal; and controlling an operating frequency of the chopper based on the control signal.

In a technical solution provided by an example embodiment the present disclosure, a feedforward correction is provided for the LLC resonant converter. The feedforward signal is provided to the chopper circuit of the LLC resonant converter via the controlled oscillator and the driving circuit, so that the feedforward correction is performed on the output of the LLC resonant converter. As a result, an effect of input ripples on output ripples can be counteracted, so that the ripples in the output voltage of the LLC resonant converter are suppressed.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
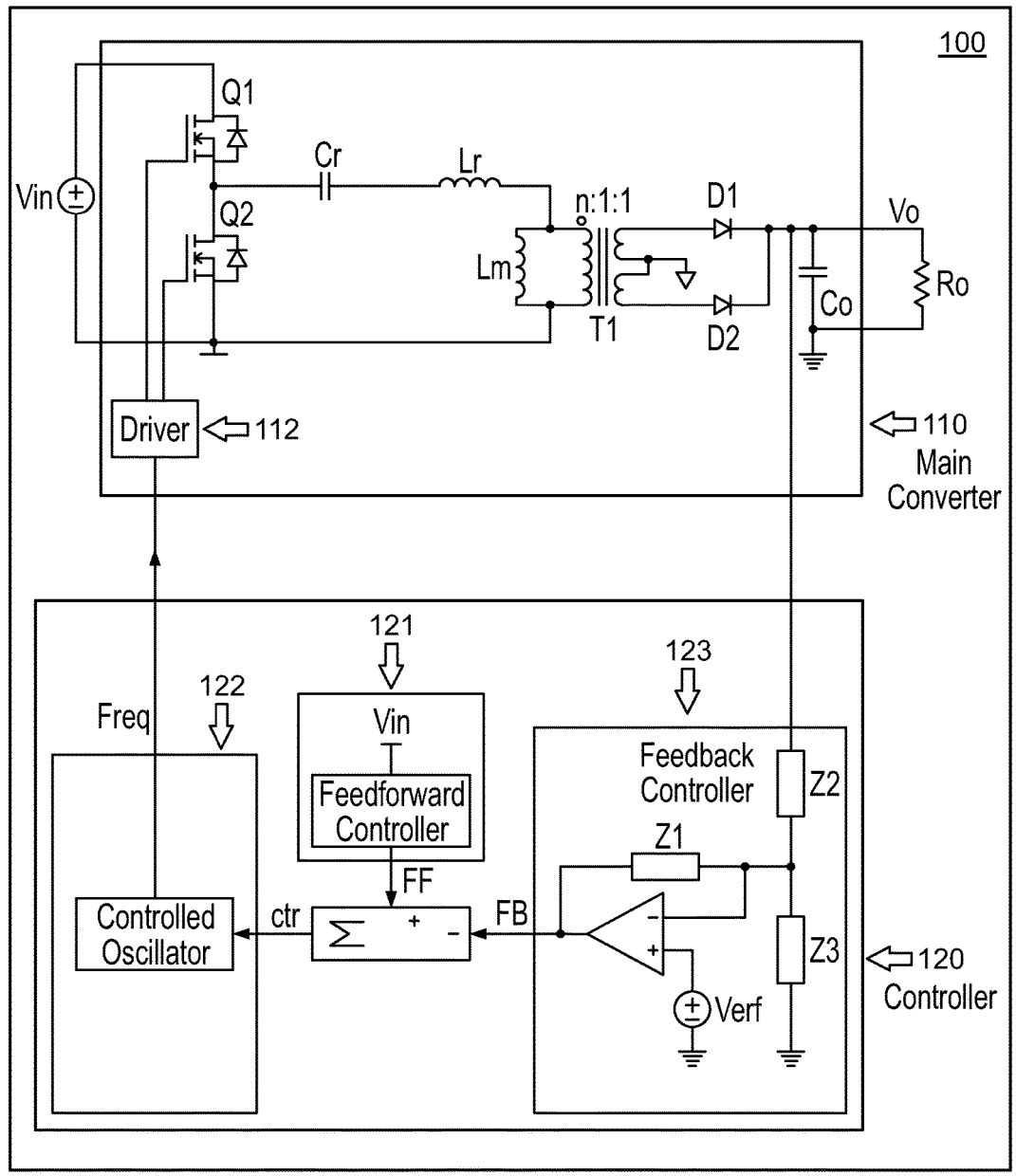
FIG. 1 is a block circuit diagram of an LLC resonant converter according to an example embodiment of the present disclosure.
Figure 2A:
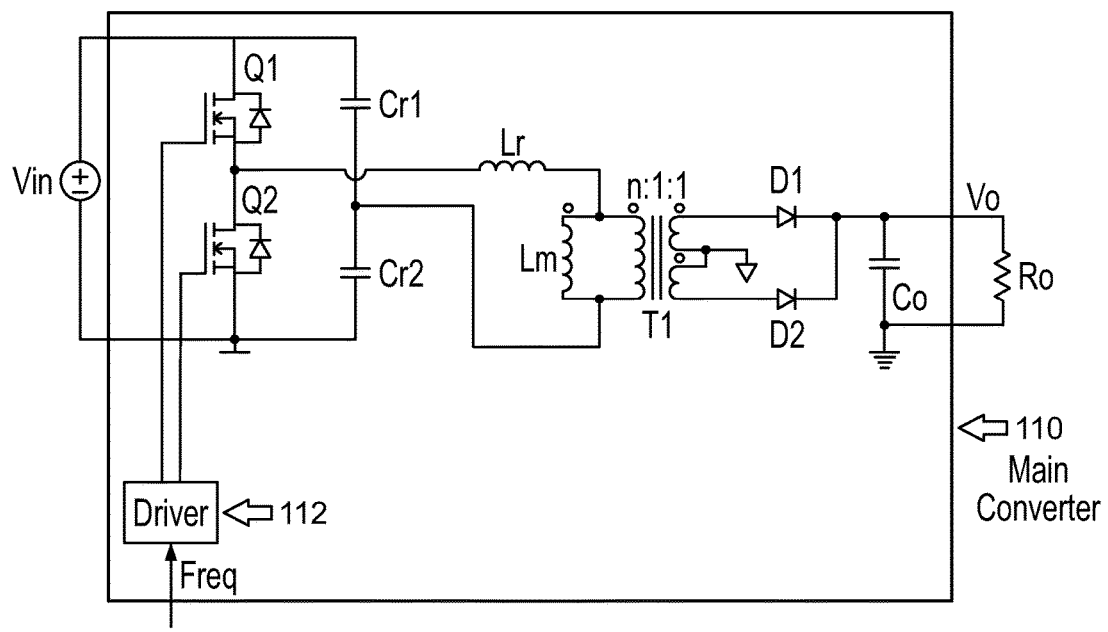
FIG. 2A to FIG. 2E show multiple alternative variants of a main converter.
Figure 2B:
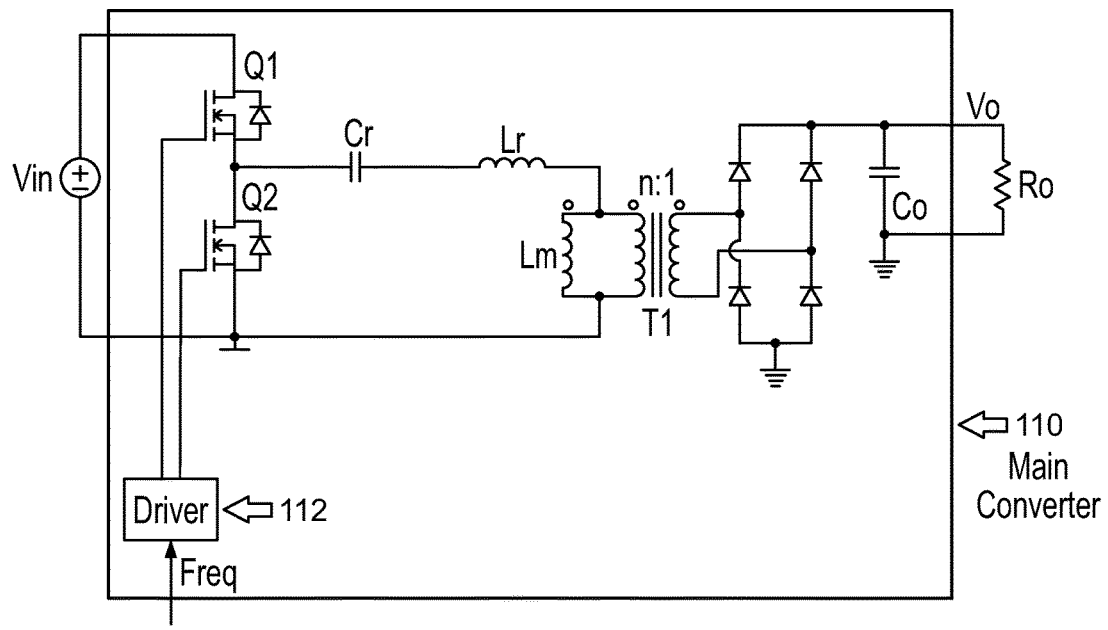
Figure 2C:
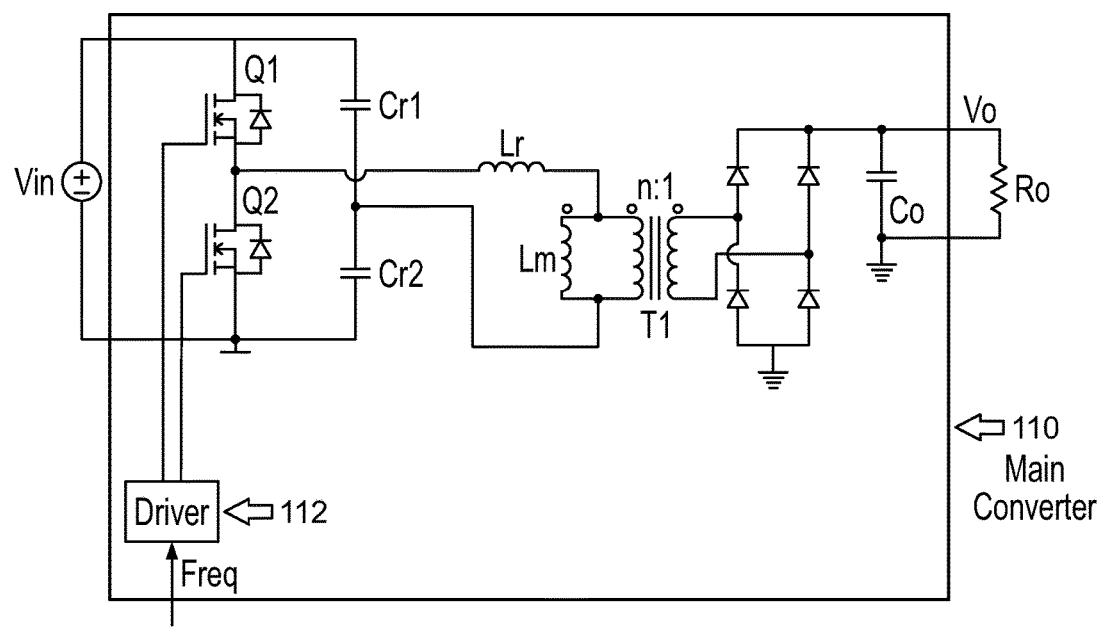
Figure 2D:
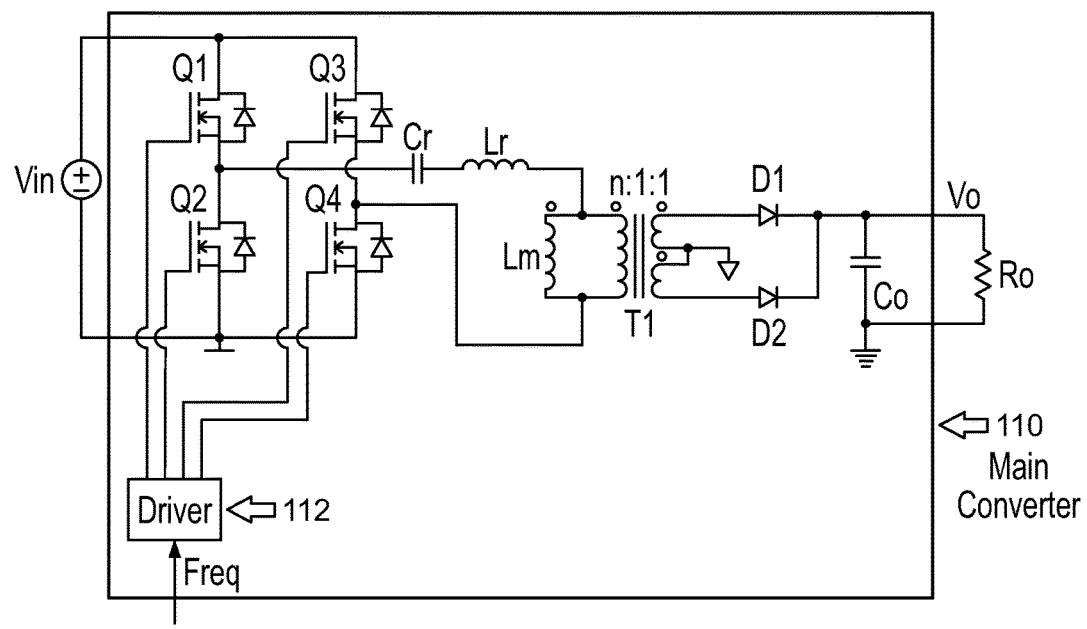
Figure 2E:
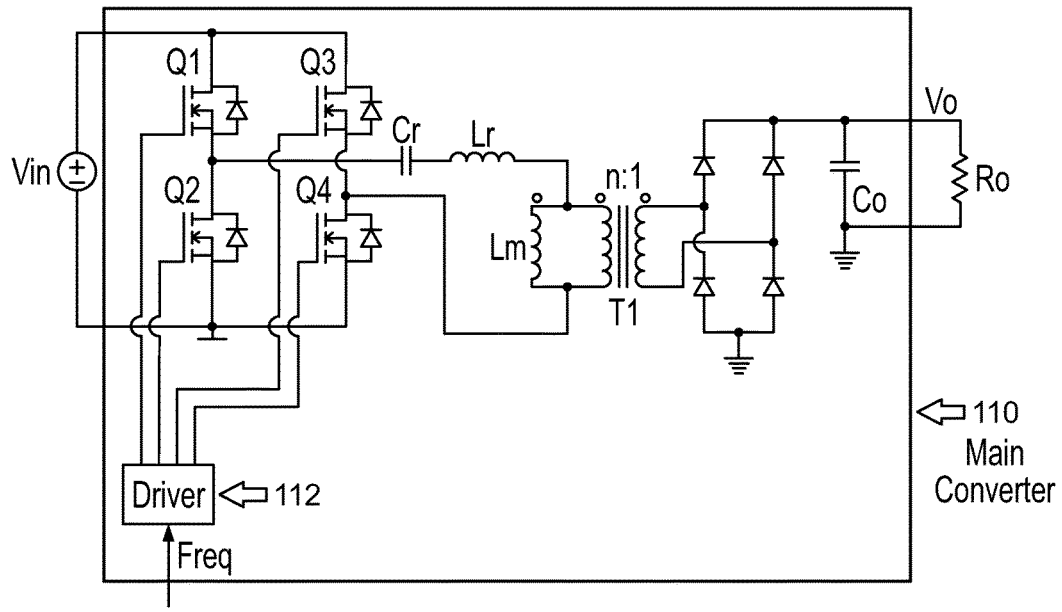

FIG. 1 is a schematic circuit diagram of an LLC resonant converter according to an embodiment of the present disclosure. As shown in FIG. 1, the LLC resonant converter 100 includes a main converter 110 and a controller 120. The main converter 110 includes a half-bridge or full-bridge chopper having a driving circuit 112, an inductance-capacitance series resonant network, an isolation transformer and a rectification and filtering circuit that are connected sequentially. As shown in FIG. 1, the chopper may consist of MOSFETs Q1, and Q2 and the driving circuit thereof. The series resonant network may consist of inductors Lr and Lm and a capacitor Cr. The isolation transformer T1 has an isolation function. Lm is an excitation inductor for the isolation transformer T1. The rectification and filtering circuit may consist of D1, D2 and a capacitor Co. The main converter may be implemented in various ways. For example, FIG. 2A through FIG. 2E show multiple alternative variants of the main converter.

As shown in FIG. 1, the controller 120 may include a feedforward controller 121 and a controlled oscillator (VCO) 122. The feedforward controller 121 may be configured to generate a feedforward signal FF based on an input voltage Vin. The controlled oscillator 122 may be configured to receive the feedforward signal from the feedforward controller 121, and control a switching frequency of the chopper in the main converter 110 via the driving circuit based on the feedforward signal.

Because an output voltage is related to the input voltage and the switching frequency of the chopper, an effect of ripples in the input voltage can be counteracted or even eliminated by setting suitable parameters of the feedforward controller 121 and controlling the chopping frequency, so that the purpose of suppressing output ripples is achieved.

As shown in FIG. 1, a controller 120 according to another embodiment of the present disclosure may further include a feedback controller 123. The feedback controller 123 may be configured to generate a feedback signal FB based on an output error voltage of the LLC resonant converter 100. A control signal ctr is generated by summing the feedback signal FB and the feedforward signal FF, and the control signal ctr is inputted to the controlled oscillator 122 so as to control the switching frequency of the chopper via the driving circuit, so that the input voltage is chopped. It can be understood that, according to different embodiments of the present disclosure, the feedback control 123 is an optional component rather than a necessary component in the LLC resonant converter.

According to an embodiment of the present disclosure, the feedforward signal FF generated by the feedforward controller 121 and the feedback signal FB generated by the feedback controller 123 are summed at an input side of the controlled oscillator 122. In a circuit design of the LLC resonant converter, especially the LLC resonant converter having a feedback control circuit, it is important as to where the feedforward signal FF generated according to the present disclosure is introduced. According to the present disclosure, the feedforward signal FF may be introduced at the input side of the controlled oscillator 122, and an effect on the circuit design will be described in detail below.

Figure 3:
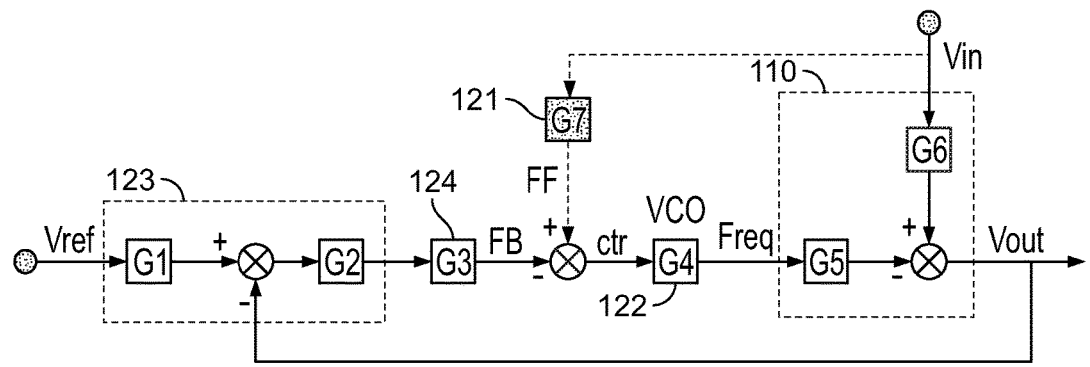
FIG. 3 is a block diagram of a transfer function of an LLC resonant converter according to an example embodiment of the present disclosure.

FIG. 3 is a block diagram of a transfer function drawn according to FIG. 1. The embodiment shown in FIG. 3 is different from that shown in FIG. 1 in that the block diagram shown in FIG. 3 further includes an optical coupling unit 124. The optical coupling unit 124 may be provided by those skilled in the art according to practical requirements.

G1 to G7 shown in FIG. 3 represent transfer functions of each of a unit, a circuit and a module, respectively. Specifically, G1 and G2 represents a transfer function of the feedback controller 123, G3 represents a transfer function of the optical coupling unit 124, G4 represents a transfer function of the controlled oscillator 122, G5 represents a transfer function of an effect of a switching frequency of the main converter 100 on the output voltage, G6 represents a transfer function of the main converter 100 from an input voltage to an output voltage, and G7 represents a transfer function of the feedforward controller 121.

As shown in FIG. 3, and considering that the DC component of the ripples in question is relatively low in general, linear approximation can be performed near an operating point on the main converter and each of the controllers. Therefore, Laplace transformation of an output voltage Vout of the LLC resonant converter may be expressed by:

$$Vout(s)=Gvref(s)\cdot Vref(s)+Gvin(s)\cdot Vin(s) \quad \text{Equation 1}$$

where Vref(s) represents Laplace transformation of a reference voltage inputted to the feedback controller 123, Gvref(s) represents a transfer function from the reference voltage to output, Vin(s) represents Laplace transformation of an input voltage of the converter, and Gvin represents an output transfer function from an input voltage to an output voltage.

As can be seen in FIG. 3, Gvref and Gvin may be expressed respectively by:

$$Gvref(s) = \frac{G1 \cdot G2 \cdot G3 \cdot G4 \cdot G5}{1 + G2 \cdot G3 \cdot G4 \cdot G5} \quad \text{Equation 2}$$

$$Gvin(s) = \frac{G6 - G4 \cdot G5 \cdot G7}{1 + G2 \cdot G3 \cdot G4 \cdot G5} \quad \text{Equation 3}$$

Then, in a case where the LLC resonant converter does not have the feedforward controller 121, that is, G7=0, the transfer function Gvin_nff from the input voltage to output is expressed by:

$$Gvin\_nff(s) = \frac{G6}{1 + G2 \cdot G3 \cdot G4 \cdot G5} \quad \text{Equation 4}$$

The equation 4 reflects an effect of an open-loop transfer function G2 G3 G4 G5 of the LLC resonant converter having the feedback controller 123 on the ripples. Although the feedback controller may select a relatively high low-frequency gain to suppress an effect of the input ripples on the output side to some degree, this method is not very effective in reducing the ripples, because it is difficult to make a tradeoff between stability and a high gain. The present disclosure provides an improvement by adding the feedforward controller 121.

According to an example embodiment of the present disclosure, Ge, which is defined by the following equation, is a ratio of a transfer function from an input voltage to an output voltage in the presence of the feedforward controller 121 to a transfer function from an input voltage to an output voltage in the absence of the feedforward controller 121. It is noted that, Ge is also a ratio of output ripples in the presence of the feedforward controller 121 to output ripples in the absence of the feedforward controller 121 in the case of the same input ripples:

$$Ge(s) = \frac{Gvin(s)}{Gvin\_nff(s)} \quad \text{Equation 5}$$

The equation 5 indicates that the transfer function of the LLC resonant converter having both the feedforward controller and the feedback controller from the input voltage to the output voltage may be regarded as a series connection of the Gvin_nff and Ge systems. In comparison with a converter without a feedforward controller, Ge provides an additional ability to suppress the ripples.

The following equation can be obtained by substituting the equations 3 and 4 into the equation 5:

$$Ge(s) = 1 - \frac{G4 \cdot G5 \cdot G7}{G6} \quad \text{Equation 6}$$

As can be seen from the equation 6, Ge is only related to the feedforward controller G7, the main converter G5 and G6 and the controlled oscillator G4, and is not related to G1, G2 and G3. In other words, Ge, which is an additional ripple gain brought by the feedforward controller 121, will not be affected regardless of the characteristics of the feedback controller 123 and the optical coupling unit 124. This is due to the fact that the above-mentioned feedforward signal is introduced at the input side of the controlled oscillator 122. In particular, this conclusion also applies to the absence of the feedback controller 123, that is, a case of open-loop control.

From a standpoint of suppressing ripples, a case of Ge(s)=0, that is, a case where any ripple of Vin has no effect on the output voltage of the LLC resonant converter, is an ideal state. Thus, an ideal value of the transfer function G7 of the feedforward controller 121 may be expressed by:

$$G7\_ideal(s) = \frac{G6}{G4 \cdot G5} \quad \text{Equation 7}$$

Thus, the feedforward controller 121 can be selected based on the transfer function G4 of the controlled oscillator 122, and the transfer functions G5 and G6 of the main converter 100.

Figure 4:
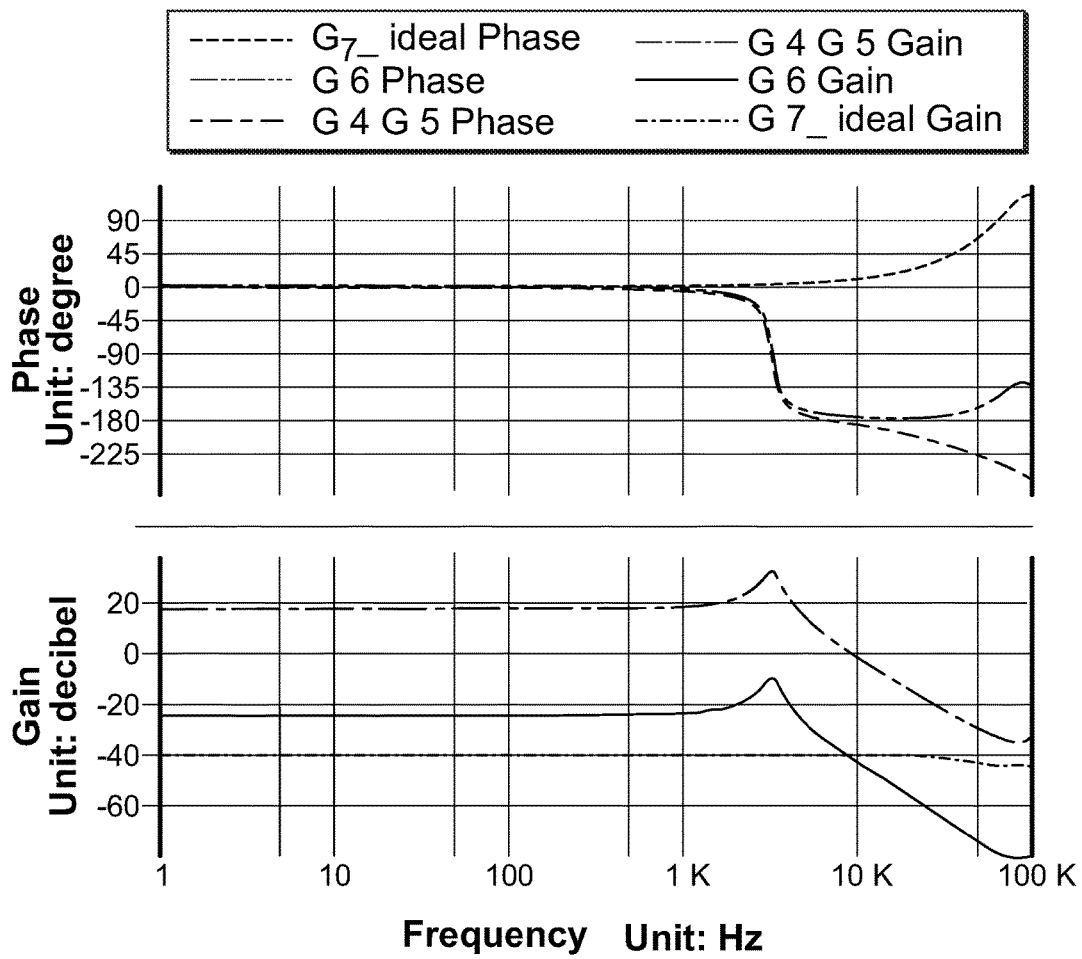
FIG. 4 is a graph showing gain-frequency and phase-frequency characteristics of an ideal feedforward controller obtained from equation 7 and through simulation.

FIG. 4 is a graph showing gain-frequency and phase-frequency characteristics of an ideal feedforward controller obtained from equation 7 and through simulation. As shown in FIG. 4, in an ideal case, both gain and phase curves of G7 are flat within a range from a close-to-DC frequency to a relatively high frequency, and the ripple frequency is relatively low, so G7_ideal can be replaced by a proportional part. In other words, the ideal feedforward controller shall have a proportional characteristic. Nevertheless, in practical applications, it may be desirable that the feedforward controller filters out the DC component or high-frequency switching noises. In addition to the proportional part, the feedforward controller G7 may use another part. Therefore, according to an example embodiment of the present disclosure, a low-pass filter or a band-pass filter is used as the feedforward controller 130. This will be described in detail below. As an example, only the suppression of input ripples close to 100 Hz or 120 Hz is discussed herein.

According to an example embodiment of the present disclosure, the feedforward controller is a low-pass filter. The filter may be a first-order low-pass filter or a higher-order low-pass filter having an angular frequency higher than a normal ripple frequency. A transfer function G7 of the low-pass filter may be expressed by:

$$G7(s) = Ke \cdot \frac{\omega n}{s + \omega n} \quad \text{Equation 8}$$

where Ke is a constant of the low-pass filter, $\omega n$ is a corner angular frequency, and s is an argument of Laplace transformation.

The following equation can be obtained from the equations 6, 7 and 8:

$$Ge(s) = \frac{s + \left(1 - \frac{Ke}{G7\_ideal}\right) \cdot \omega n}{s + \omega n} \quad \text{Equation 9}$$

The amplitude-frequency characteristic (Ge_in_gain) of the corresponding Ge can be obtained by:

$$Ge\_in\_gain = \sqrt{\frac{\left(\frac{\omega}{\omega n}\right)^2 + \left(1 - \frac{Ke}{G7\_ideal}\right)^2}{\left(\frac{\omega}{\omega n}\right)^2 + 1}} \quad \text{Equation 10}$$

A suitable low-pass filter may be selected as the feedforward controller 121 based on the equation 10, so as to generate the feedforward signal, thereby suppressing the ripples in the DC-DC converter.

Figure 5:
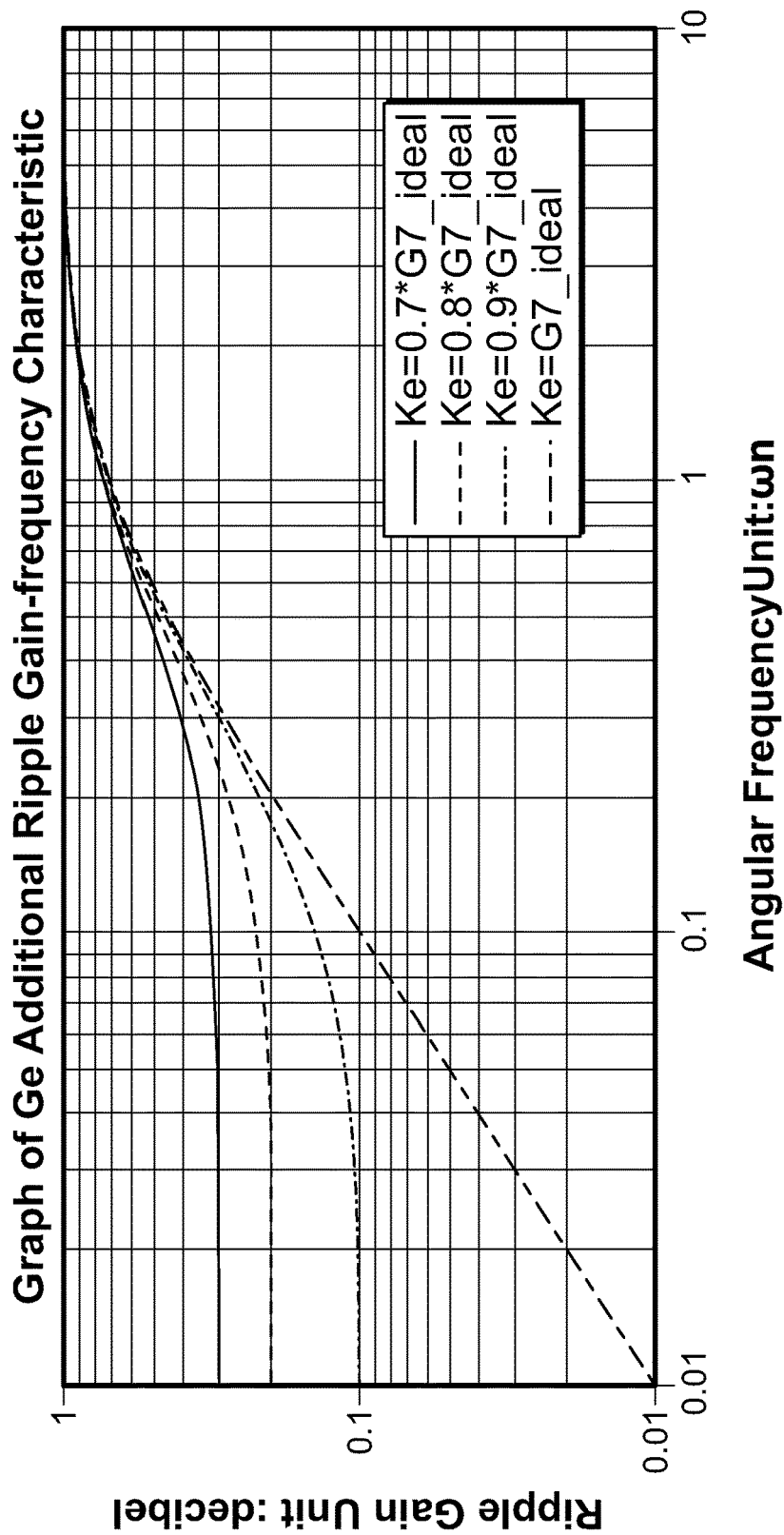
FIG. 5 is a graph showing a normalized angular frequency characteristic in a case where a low-pass filter is used as a feedforward controller.

FIG. 5 is a graph showing a normalized angular frequency characteristic of an additional ripple gain Ge in a case where a low-pass filter is used as a feedforward controller. As can be seen in FIG. 5, the ripple gain can be effectively suppressed by selecting a suitable Ke and a higher corner frequency than a ripple frequency.

According to another example embodiment of the present disclosure, the feedforward controller 121 is a band-pass filter, which may be a second-order band-pass filter or a higher-order band-pass filter. A transfer function of the band-pass filter may be expressed by:

$$G7(s) = Ke \cdot \frac{2 \cdot \xi \cdot \omega n \cdot s}{s^2 + 2 \cdot \xi \cdot \omega n \cdot s + \omega n^2} \quad \text{Equation 11}$$

where Ke is a constant of the band-pass filter, $\omega n$ is a natural oscillation angular frequency, s is an argument of Laplace transformation, and is a damping coefficient.

The following equation can be obtained from the equations 6, 7 and 11:

$$Ge(s) = Ke \cdot \frac{s^2 + 2 \cdot \left(1 - \frac{Ke}{G7\_ideal}\right) \cdot \xi \cdot \omega n \cdot s + \omega n^2}{s^2 + 2 \cdot \xi \cdot \omega n \cdot s + \omega n^2} \quad \text{Equation 12}$$

Thus, a feedforward increment Ge_in_gain (amplitude-frequency characteristic) of a gain of the band-pass filter may be expressed by:

$$Ge\_in\_gain = \sqrt{\frac{\left(\frac{\frac{\omega n}{\omega} - \frac{\omega}{\omega n}}{2\xi}\right)^2 + \left(1 - \frac{Ke}{G7\_ideal}\right)^2}{\left(\frac{\frac{\omega n}{\omega} - \frac{\omega}{\omega n}}{2\xi}\right)^2 + 1}} \quad \text{Equation 13}$$

Then, a suitable band-pass filter may be selected as the feedforward controller 121 based on the equation 13, so as to generate a feedforward signal, thereby suppressing ripples in the DC-DC converter.

Figure 6:
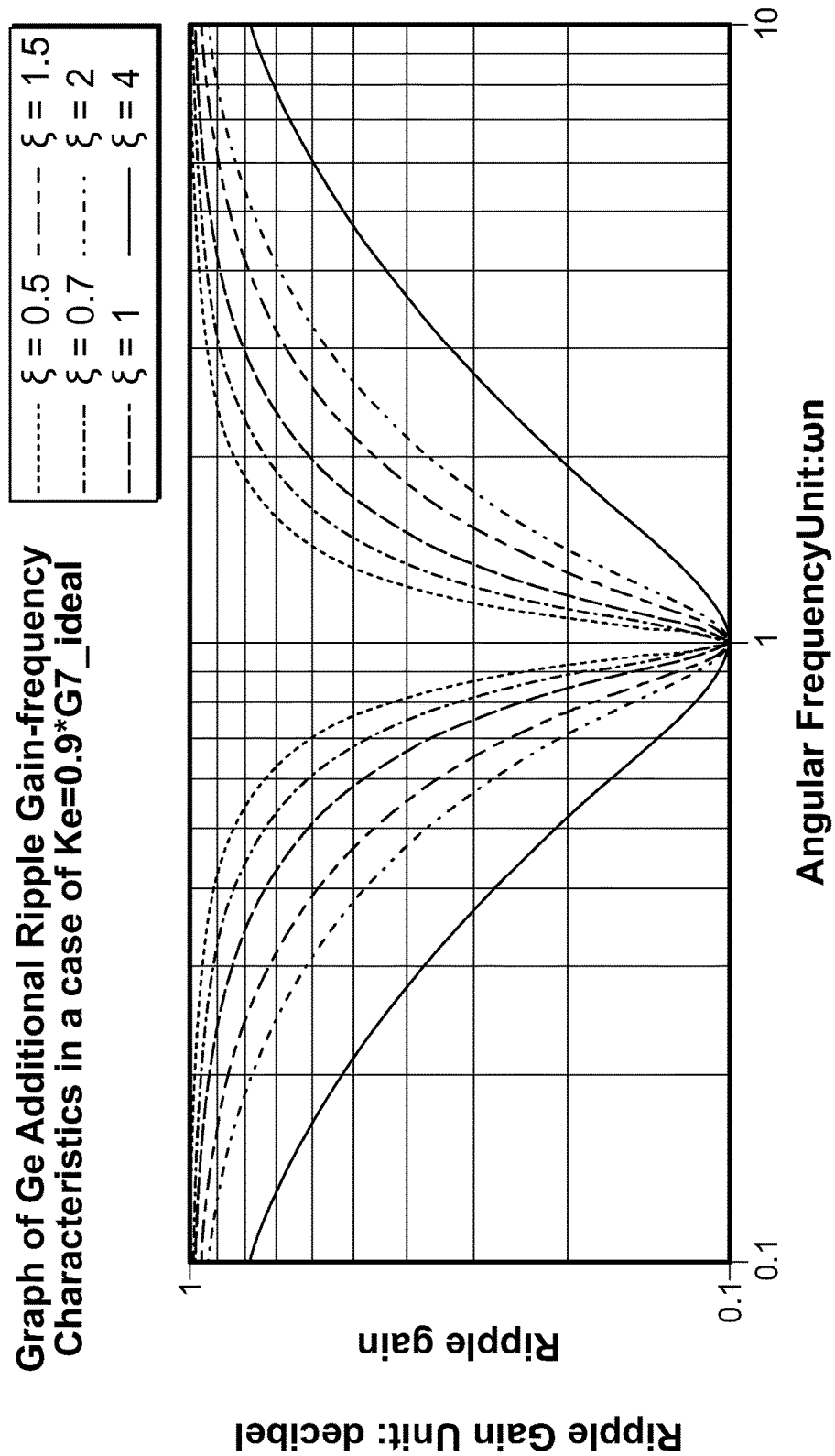
FIG. 6 is a graph showing normalized angular frequency characteristics of a Ge gain for different damping coefficients in a case where a band-pass filter is used as a feedforward controller.

FIG. 6 is a graph showing normalized angular frequency characteristics of an additional ripple gain G5 for different damping coefficients in a case where a band-pass filter is used as a feedforward controller and Ke is set to 0.9·G7_ideal. As can be seen in FIG. 6, the ripple gain is very low in a case of ωn=1 regardless of a value of the damping coefficient ζ, while the ripple gain is close to 1 in a case where the angular frequency is close to 0 or positive infinity, in other words, DC and high-frequency components of the input voltage are ineffective.

Figure 7:
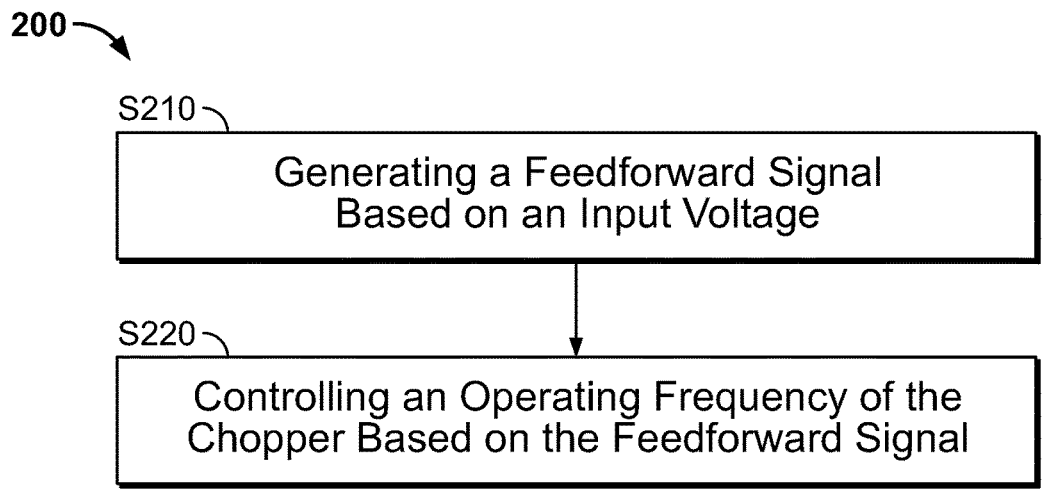
FIG. 7 is a flow diagram showing a method for suppressing ripples in an output voltage of an LLC resonant converter according to an embodiment of the present disclosure.

FIG. 7 is a flow diagram showing a method for suppressing ripples in an output voltage of the converter according to an example embodiment of the present disclosure. In the method 200 as shown in FIG. 7, the LLC resonant converter includes a main converter, which includes a half-bridge or full-bridge chopper having a driving circuit, an inductance-capacitance series resonant network, an isolation transformer and a rectification and filtering circuit that are connected sequentially.

As shown in FIG. 7, the method 200 may include steps S210 and S220. In the step S210, a feedforward signal is generated based on an input voltage. In the step S220, an operating frequency of the chopper is controlled based on the feedforward signal.

According to a specific example of the present disclosure, in the method 200, the feedforward signal is generated by a filter having a proportional, low-pass or band-pass filtering characteristic based on the input voltage.

According to another specific example of the present disclosure, in the method 200, the filter is implemented by an analog circuit, or by a discrete circuit that is based on an equivalent or approximate transformation.

Figure 8:
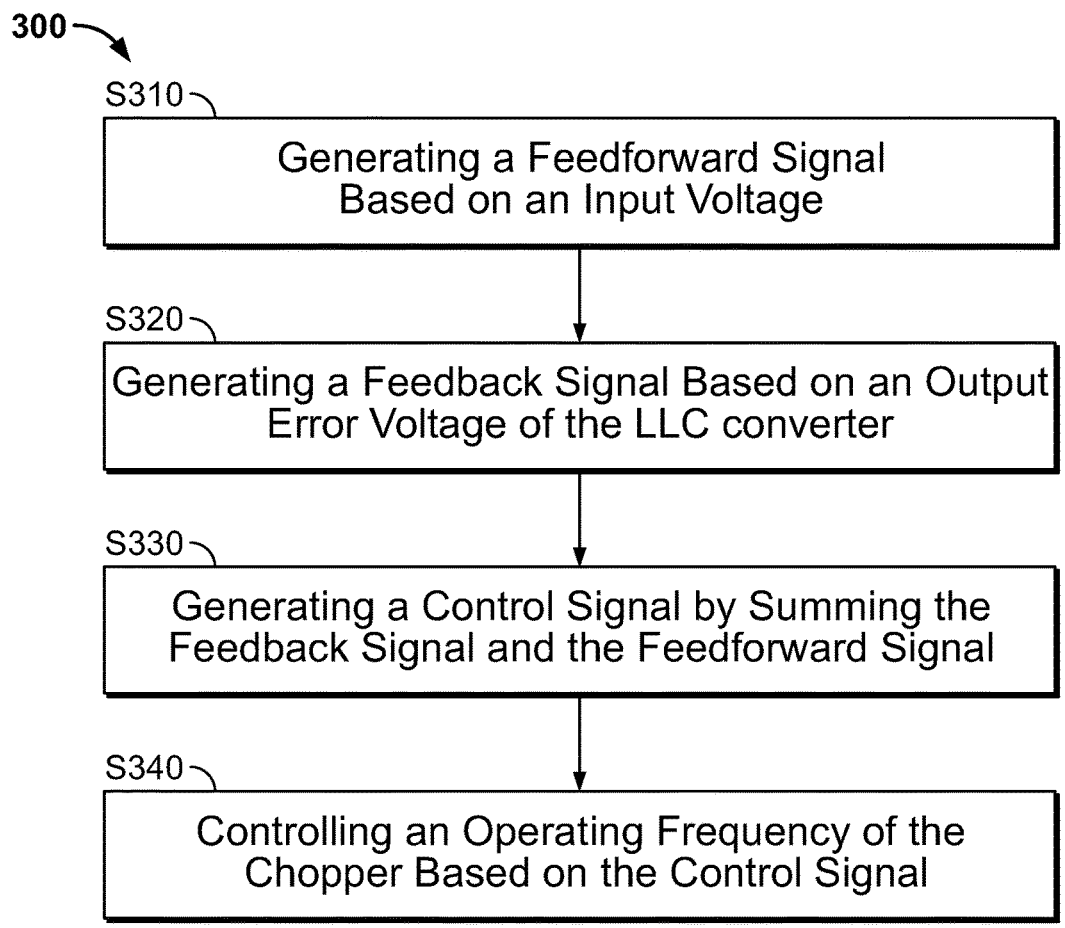
FIG. 8 is a flow diagram showing a method for suppressing ripples in an output voltage of an LLC resonant converter according to another embodiment of the present disclosure.

FIG. 8 is a flow diagram showing a method for suppressing ripples in an output voltage of an LLC resonant converter according to another example embodiment of the present disclosure. In the method 300 as shown in FIG. 8, the LLC resonant converter includes a main converter, which includes a half-bridge or full-bridge chopper having a driving circuit, an inductance-capacitance series resonant network, an isolation transformer and a rectification and filtering circuit that are connected sequentially.

As shown in FIG. 8, the method 300 may include steps S310, S320, S330 and S340. In the step S310, a feedforward signal is generated based on an input voltage. In the step S320, a feedback signal is generated based on an output error voltage of the converter. In the step S330, a control signal is generated by summing the feedback signal and the feedforward signal. In the step S340, an operating frequency of the chopper is controlled based on the control signal.

Likewise, according to an example of the present disclosure, in the method 300, the feedforward signal is generated by a filter having a proportional, low-pass or band-pass filtering characteristic based on the input voltage.

In addition, according to another example of the present disclosure, in the method 300, the filter is implemented by an analog circuit, or by a discrete circuit that is based on an equivalent or approximate transformation.

A transfer function of the low-pass filter or the band-pass filter mentioned in the method 200 and 300 may be designed by using the same method as the transfer function of the low-pass filter or the band-pass filter used in the LLC resonant converter as described above, respectively, and a detailed description thereof is omitted herein for conciseness.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An LLC resonant converter, comprising:
   a half-bridge or full-bridge chopper having a driving circuit;
   an inductance-capacitance series resonant network coupled to the chopper;
   an isolation transformer coupled to the resonant network;
   a rectification and filtering circuit coupled to the isolation transformer;
   a linear proportional feedforward controller comprising at least one of a low-pass filter and a band-pass filter coupled to generate a feedforward signal based on an input voltage; and
   a controlled oscillator coupled to receive the feedforward signal from the feedforward controller and to control an operating frequency of the chopper via the driving circuit based on the feedforward signal.

2. The LLC resonant converter according to claim 1, further comprising:
   a feedback controller coupled to generate a feedback signal based on an output error voltage of the LLC resonant converter;
   wherein the controlled oscillator is coupled to receive the feedback signal and the feedforward signal to control the operating frequency of the chopper via the driving circuit.

3. The LLC resonant converter according to claim 2, wherein the feedforward signal and the feedback signal are summed at an input side of the controlled oscillator.

4. The LLC resonant converter according to claim 2, wherein the feedforward controller, the feedback controller and/or the controlled oscillator are implemented by an analog circuit, or by a discrete circuit that is based on an equivalent or approximate transformation.

5. The LLC resonant converter according to claim 1, wherein the feedforward controller comprises the low-pass filter.

6. The LLC resonant converter according to claim 5, wherein a transfer function of the low-pass filter satisfies the following equation:

$$G7(s) = Ke \cdot \frac{\omega n}{s + \omega n}$$

where Ke represents a filter coefficient of the low-pass filter, ωn represents an ripple angular frequency, and s represents an argument of Laplace transformation.

7. The LLC resonant converter according to claim 1, wherein the feedforward controller comprises the band-pass filter.

8. The LLC resonant converter according to claim 7, wherein a transfer function of the band-pass filter satisfies the following equation:

$$G7(s) = Ke \cdot \frac{2 \cdot \xi \cdot \omega n \cdot s}{s^2 + 2 \cdot \xi \cdot \omega n \cdot s + \omega n^2}$$

where Ke represents a filter coefficient of the band-pass filter, ωn represents a natural oscillation angular frequency, s represents an argument of Laplace transformation, and ξ represents a damping coefficient.

9. A method for suppressing ripples in an output voltage of an LLC resonant converter, the LLC resonant converter comprising a half-bridge or full-bridge chopper having a driving circuit, an inductance-capacitance series resonant network coupled to the chopper, an isolation transformer coupled to the resonant network, and a rectification and filtering circuit coupled to the isolation transformer, the method comprising:

generating, by a linear proportional feedforward controller comprising at least one of a low-pass filter and a band-pass filter, a feedforward signal based on an input voltage; and controlling, by a controlled oscillator, an operating frequency of the chopper based on the feedforward signal.

10. The method according to claim 9, wherein the filter has a band-pass filtering characteristic.

11. The method according to claim 10, wherein the filter is implemented by an analog circuit, or by a discrete circuit that is based on an equivalent or approximate transformation.

12. A method for suppressing ripples in an output voltage of an LLC resonant converter, the LLC resonant converter comprising a half-bridge or full-bridge chopper having a driving circuit, an inductance-capacitance series resonant network coupled to the chopper, an isolation transformer coupled to the resonant network, and a rectification and filtering circuit coupled to the isolation transformer, the method comprising:

generating, by a linear proportional feedforward controller comprising at least one of a low-pass filter and a band-pass filter, a feedforward signal based on an input voltage;

generating a feedback signal based on an output error voltage of the LLC resonant converter;

generating a control signal by summing the feedback signal and the feedforward signal; and controlling, by a controlled oscillator, an operating frequency of the chopper based on the control signal.

13. The method according to claim 12, wherein the filter has a low-pass filtering characteristic.

14. The method according to claim 13, wherein the filter is implemented by an analog circuit, or by a discrete circuit that is based on an equivalent or approximate transformation.

\* \* \* \* \*